Nov. 25, 1958　　　O. MUELLER　　　2,861,477
PUMP AND LOCK FOR DIFFERENTIAL
Filed Nov. 21, 1955　　　　　　　　　　　7 Sheets-Sheet 1

INVENTOR.
Otto Mueller
BY
Harness, Dickey & Pierce
ATTORNEYS

Nov. 25, 1958

O. MUELLER

2,861,477

PUMP AND LOCK FOR DIFFERENTIAL

Filed Nov. 21, 1955

INVENTOR.
Otto Mueller
BY
Harness, Dickey & Pierce
ATTORNEYS

Nov. 25, 1958

O. MUELLER 2,861,477

PUMP AND LOCK FOR DIFFERENTIAL

Filed Nov. 21, 1955

INVENTOR.
Otto Mueller
BY
Harness, Dickey & Pierce
ATTORNEYS

Nov. 25, 1958

O. MUELLER 2,861,477

PUMP AND LOCK FOR DIFFERENTIAL

Filed Nov. 21, 1955

INVENTOR.
Otto Mueller
BY
Harness, Dickey & Pierce
ATTORNEYS

# United States Patent Office 2,861,477
Patented Nov. 25, 1958

2,861,477

PUMP AND LOCK FOR DIFFERENTIAL

Otto Mueller, Dearborn, Mich.

Application November 21, 1955, Serial No. 547,929

14 Claims. (Cl. 74—711)

This invention relates to differentials, and particularly to a pump and locking device for a differential.

Differentials for automotive vehicles have been employed in the art for many years, the differential permitting the movement of the driven wheels at different speeds when the vehicle is traveling on a curve. It is desirable at times to prevent the differential action, especially when one or both wheels have lost traction on ice, mud, gravel or the like. Many attempts have been made to provide a differential lock to cause both wheels to be positively driven but usually these were of the mechanical type which positively locked and, as a result, placed too great a strain on the axles and differential parts, causing the fracture or rupture thereof.

In the copending application of Otto Mueller, Serial No. 346,660, filed April 3, 1953, for Control for Differential Drive, a lock of the fluid type for a differential is disclosed, the degree of locking of which may be controlled so as to avoid the shock on the various elements of the differential when the lock is operating. One portion of the fluid lock is secured to the side gear and axle of the differential while the other portion thereof is secured to the differential case, with the parts so interrelated that when one wheel attempts to spin a pumping action is produced within the locking components which locks up the differential parts to a desired degree and provides a driving relation between both of the driving wheels of the vehicle.

The present invention relates to the improved construction of the differential fluid lock providing a positive flow of oil thereto and to the gears and bearings of the case for the positive lubrication thereof. In the differential of the above recited application, the housing had an increased amount of oil provided thereto to have it available at all times for the lock. This was objected to by the vehicle manufacturer because of cost and the better seals required to prevent leakage because of the additional oil. The present differential operates on the amount of oil which is normally provided in the differential housing plus a small amount required for the lock. Since only a small amount of oil is used in the differential housing, difficulty has been experienced especially at prolonged high speed of operation due to the centrifugal throwing of the oil away from the case, resulting in the lack of lubrication of the bearings, the side and pinion gears. The addition of the pumping device to the case to supply oil thereto and to the lock has the advantage of providing oil to the bearings and the gears at all times. It is contemplated that such pumping device may be employed on the differential without the lock to have the bearings and gears properly lubricated at all times. The pump may be built directly within the case to operate in the forward movement of the vehicle or may be a separate element which shifts to different positions upon the change of the forward to rearward movement of the vehicle and back to forward movement. With each change of direction between forward and rearward movement of the vehicle, the position of the pumping device will be changed so that a positive flow of fluid to the case will occur at all times irrespective of whether the vehicle is going forward or is backing up.

Accordingly, the main objects of the invention are: to provide a pumping device on the case of a differential which delivers oil to the area within the case; to provide a pumping device for delivering oil within the area of the case which operates both in the forward and rearward movement of the vehicle; to provide a pumping device for delivering oil to within the case and to a fluid locking device for locking the differential; to provide a fluid pumping device as a lock for a differential having one part secured to a side gear or axle and the other part secured to the case which are interlocked by oil delivered between the pump parts through a shiftable plate having intake passageways the positions of which change when the direction of relative rotation between the compression ring and rotor of the fluid lock changes; to provide a floating piston adjacent to a shiftable plate having intake passageways for delivering oil to the locking elements of a differential, the pressurized fluid of which applies pressure to the piston for urging the plate toward the side of the locking elements to effect the sealing thereof; to provide a resilient element between the side gears in a differential case for applying pressure thereto and to seal the case from the axles extending thereinto, and, in general, to provide a lock for a differential and a pumping device for delivering the oil within the housing of the differential to the interior of the case and to the lock, all of which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein.

Referring to Figs. 1 to 4, a differential is illustrated of substantially the standard type having a case 10 which supports a ring gear 11 which is driven by a pinion 12 in the conventional manner. At one side of the case an axle 13 is splined to a side gear 14 and sealed to the case by an O-ring 15. A barrel 16 and a cap 17 are secured to the case 10 by a plurality of studs 18 and nuts 19. A compression ring 21 of a fluid locking device 22 is secured to the barrel by the studs 18 in fixed relation to the case 10. An axle 23 is splined to a side gear 24 on the other side of the case which has outer splines 25 to which the internal splines of the rotor 26 of the locking device 22 are rigidly secured. The rotor 26 has a plurality of slots 27 therein in which vanes or blades 28 are secured for inner and outer movement. Each side face of the rotor 26 is provided with an annular slot 29 in each of which a spring 31 is secured to be disposed in engagement with the under side of the vanes or blades 28 for providing initial pressure for maintaining the vanes against the inner surface of the compression ring 21. The spring is preferably made as a cable having spring wire wound about itself on a very slow lead to form an annular spring which tends to assume a circular position. On the inner side face of the compression ring 21 and rotor 26 a plate 32, containing diametrically disposed inlet orifices 33, is provided, and interjacent these orifices and diametrically disposed are the outlet orifices 34. The plate is provided with diametrically disposed arcuate recesses 35 in the periphery thereof in which diametrically disposed pins 36 extend. The length of the arcuate recess is substantially 90° and the pins limit the movement of the plate this amount from one to the other end of the arcuate recess.

Figure 1:
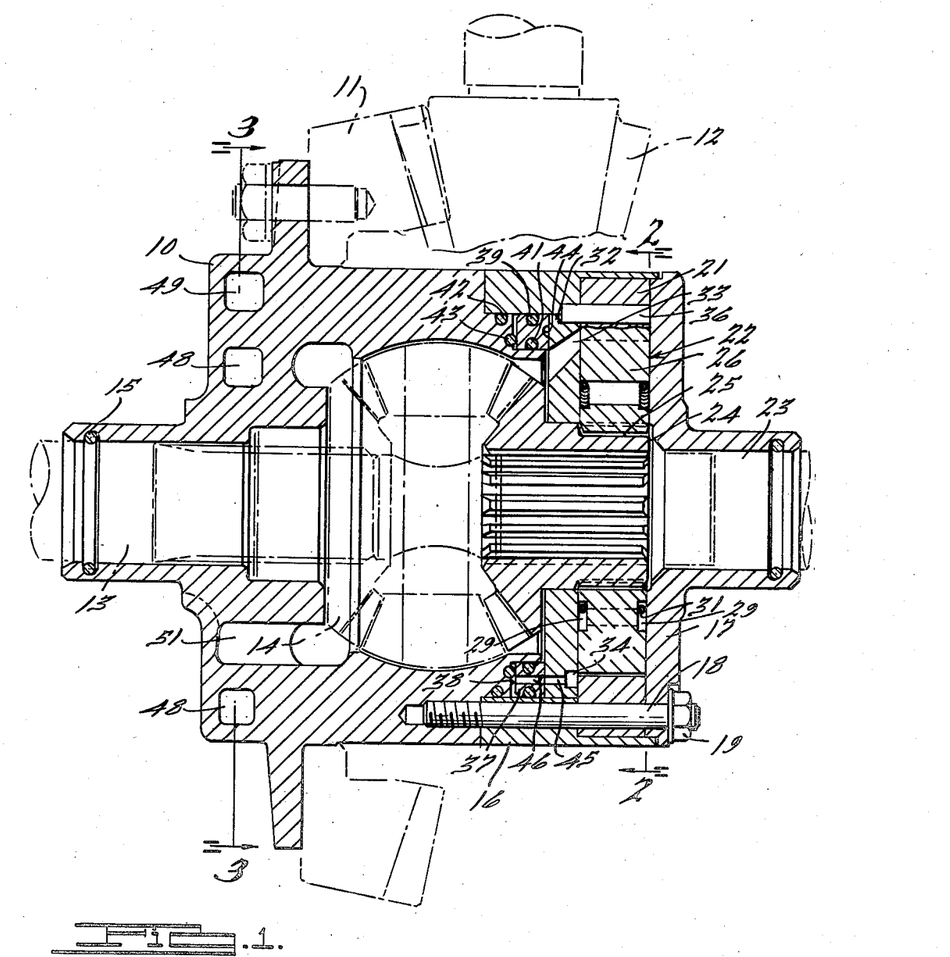
Figure 1 is a sectional view of a differential having a lock and pumping device, embodying features of the present invention.
Figure 2:
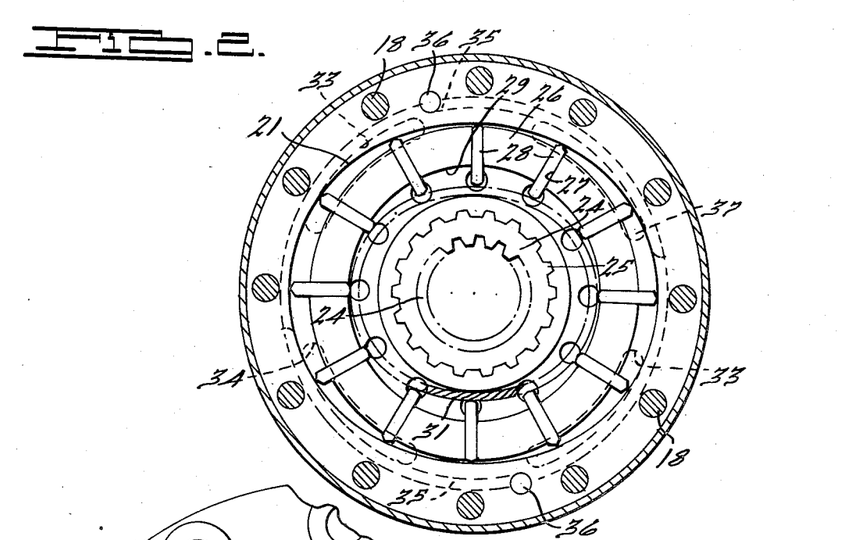
Fig. 2 is a sectional view of the structure illustrated in Fig. 1, taken on the line 2—2 thereof.
Figure 3:
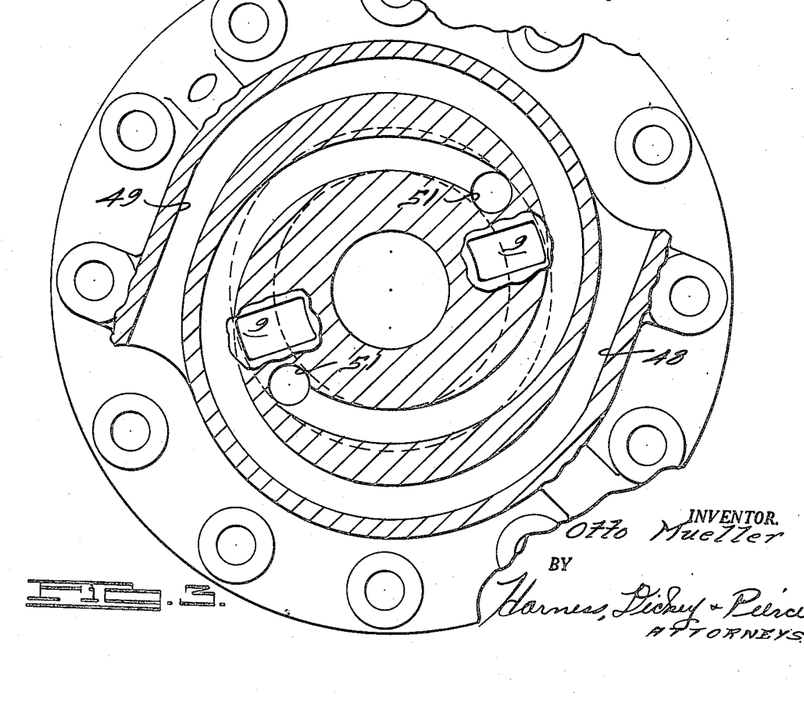
Fig. 3 is a broken sectional view of the structure illustrated in Fig. 1, taken on the line 3—3 thereof.

An annular piston 37 abuts the inner face of the plate 32 adjacent to the outer edge thereof, the piston being sealed within a recess 38 in the case 10 by the pair of O-rings 39 and 41. An O-ring 42 seals the barrel 16 to the case 10 and an O-ring 43 provides initial pressure on the rear face of the piston 37, urging it toward the plate 32. It is to be understood that other means besides the O-ring 43 may be empolyed for providing this initial pressure. The inner face of the piston 37 has an annular slot 44 which communicates with a plurality of apertures 45 extending from the outlet orifices 34. A plurality of apertures 46 extend through the annular piston 37 from the slots 44 through which oil under pressure is delivered from the outlet orifices 34 through the apertures 45 to the annular slot 44 and the apertures 46 into the bottom of the slot 38 in which the piston 37 is disposed for movement outwardly thereof. The oil under pressure delivered to the rear of the piston 37 moves the piston outwardly to force the plate 32 against the inner side of the compression ring 21 and the rotor 26, thereby reducing any leakage of the oil from the locking element 22 to a minimum.

Figure 4:
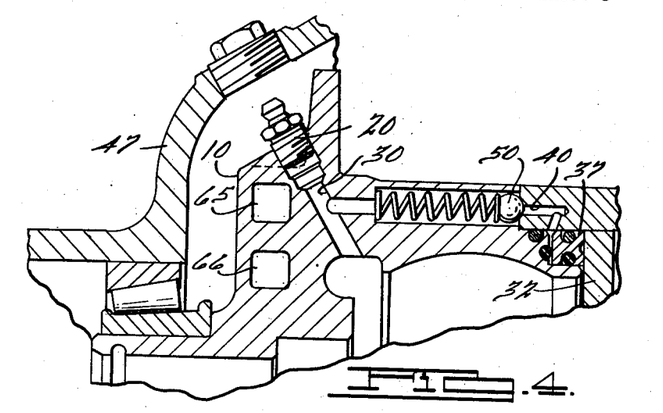
Fig. 4 is a broken sectional view of the differential illustrated in Fig. 1 and the housing in which it is mounted.

The oil back of the piston 37 communicates with a passage connected to a valve 50 which bypasses the oil when the pressure thereon exceeds a predetermined amount. The by-passed oil is returned to the interior of the case through the passageway 30 which can also be employed as a fill passageway closed by a fitting 20. The case is mounted within a differential housing 47, as illustrated in Fig. 4, to operate with the oil normally provided within the housing. To make such operation possible, the case 10 is cored to provide a pair of passageways 48 and 49 which scoop up the oil in the bottom of the housing and force it inwardly through the passageways 48 and 49 and through apertures 51 to within the case 10. In this manner a positive flow of oil is provided to the gears and bearings within the case and to the intake passages 33 of the plate 32. This positive supply of oil to the interior of the case assures the lubrication of the gears and bearings at all times whether or not the lock is employed in the differential. This positive flow within the case, however, is desirable to supply oil to the fluid locking device 22 when a minimum amount of oil is present in the housing 47 of the differential.

The pump, as illustrated in Figs. 1 to 4 inclusive, is of a unidirectional type providing a flow of oil when the vehicle is operating in a forward direction. This particular type of pump is satisfactory for passenger and other road vehicles which are operated at very short intervals in a reverse direction. Sufficient oil will be present for operating the lock and for lubricating purposes during the short intervals when the vehicle is driven in reverse. A pair of recesses 9 is provided in the end face of the case 10 for receiving the claw ends of a tool which applies a force to remove the bearing 8.

Figure 7:
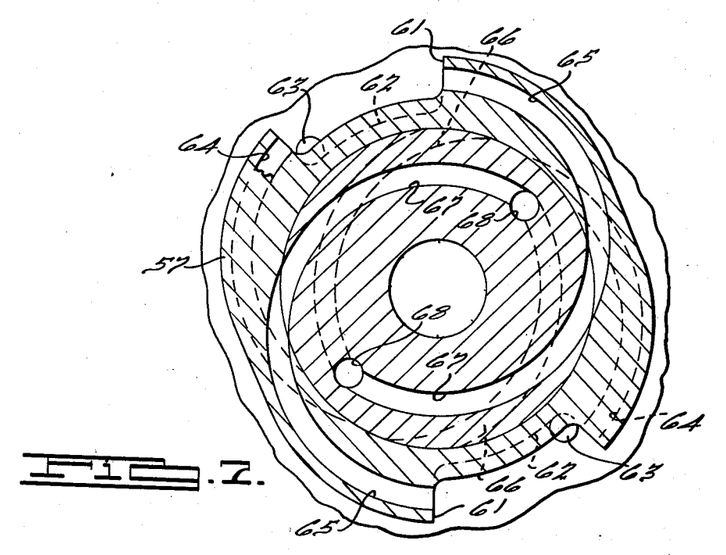
Fig. 7 is a sectional view of the structure illustrated in Fig. 5, taken on the line 7—7 thereof, showing the pumping device when adjusted to one position.
Figure 8:
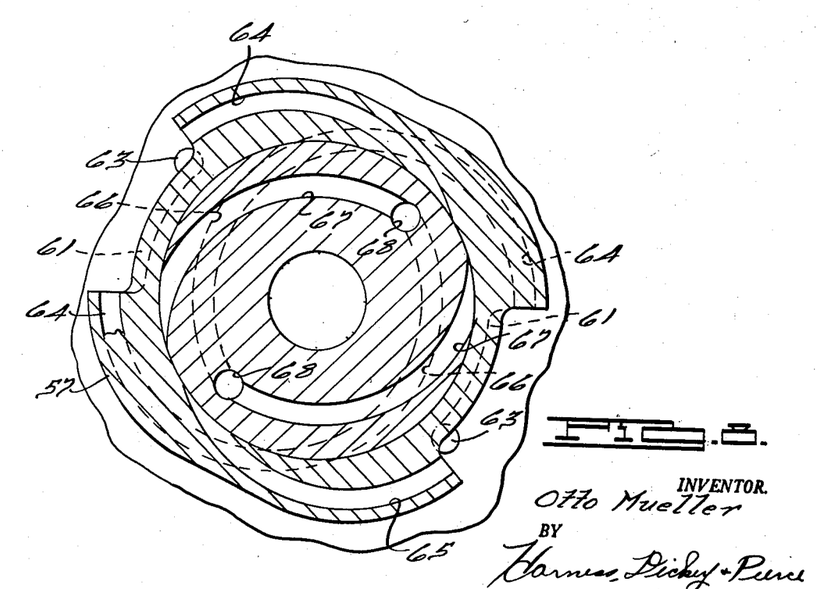
Fig. 8 is a view of the structure illustrated in Fig. 7, with the pumping device adjusted to its other position.

In Figs. 5 to 8 inclusive a pump is illustrated which operates in both directions of movement of the vehicle. This provides a flow of oil in both directions of operation, providing assurance that sufficient oil is present when the vehicle is operating in a forward or reverse direction for a sustained period. The case 55 has a cylindrical portion 56 on which the pump element 57 is mounted for relative rotation, being secured in position by a snap ring 58 disposed in an annular recess 59 in the forward portion of the case. The pump 57 has a pair of recesses 61 diametrically disposed, at the base of which a recess 62 is provided in which a pin 63, secured to the case, extends. The pin limits the angular movement of the pump element 57 on the cylindrical portion 56 of the case. A pair of identical passageways 64 extends through the pump element 57 from one side of the recesses 61. A second pair of identical passageways 65 is provided in the pump element from the opposite side of the recesses 61 but in a different plane from that occupied by the passageways 64. The passageways 64 are in a position to pump oil when the case is rotating in one direction, while the passageways 65 are in a position to pump fluid when the case is rotating in opposite direction. A pair of passageways 66 is provided in the case in the plane of and in communication with the passageways 64 when driven in a direction to pump oil, as illustrated in Fig. 8, and cut off therefrom when the case is driven in the opposite direction, as illustrated in Fig. 7. A second pair of passageways 67 is provided in the plane of and in communication with the passageways 65 when driven in a direction to pump oil, as illustrated in Fig. 7, and cut off therefrom when the case is driven in the opposite direction, as illustrated in Fig. 8. The passageways 66 and 67 communicate with apertures 68 in the case through which the pumped oil is directed into the interior of the case and to the gear elements, bearings and the fluid lock carried thereby. When the case rotates in a counterclockwise direction, as illustrated in Fig. 7, the pin 63 engages the end of the recess 62 adjacent to the inlet to the passageways 64, causing the passageways 65 to advance into the oil in the bottom of the housing. The oil is forced through the passageways 65 and 67 into the apertures 68 and into the case where it will be maintained since the passageways 66 are cut off from the passageways 64. When the case is operating in a clockwise direction, as illustrated in Fig. 8, the pin 63 will move to the opposite side of the slot 62 adjacent to the passageways 65 and cause the passageways 64 to advance into the oil in the bottom of the housing. The passageways 64 are joined to the passageways 66 and oil will be forced therethrough and through the apertures 68 to within the case where it will be maintained since the passageways 65 are cut off from the passageways 67. In either direction of operation of the vehicle, a positive delivery of fluid will be provided to the case for lubricating the bearings and the gears therewithin and for supplying fluid to a lock 22 when the lock is employed on the differential. This positive flow of fluid to the bearings and the gears within the case permits a minimum amount of oil to be employed within the housing of the differential and assures proper lubrication at all times where heretofore the oil supply often failed at high speed operation of the vehicle.

Figure 9:
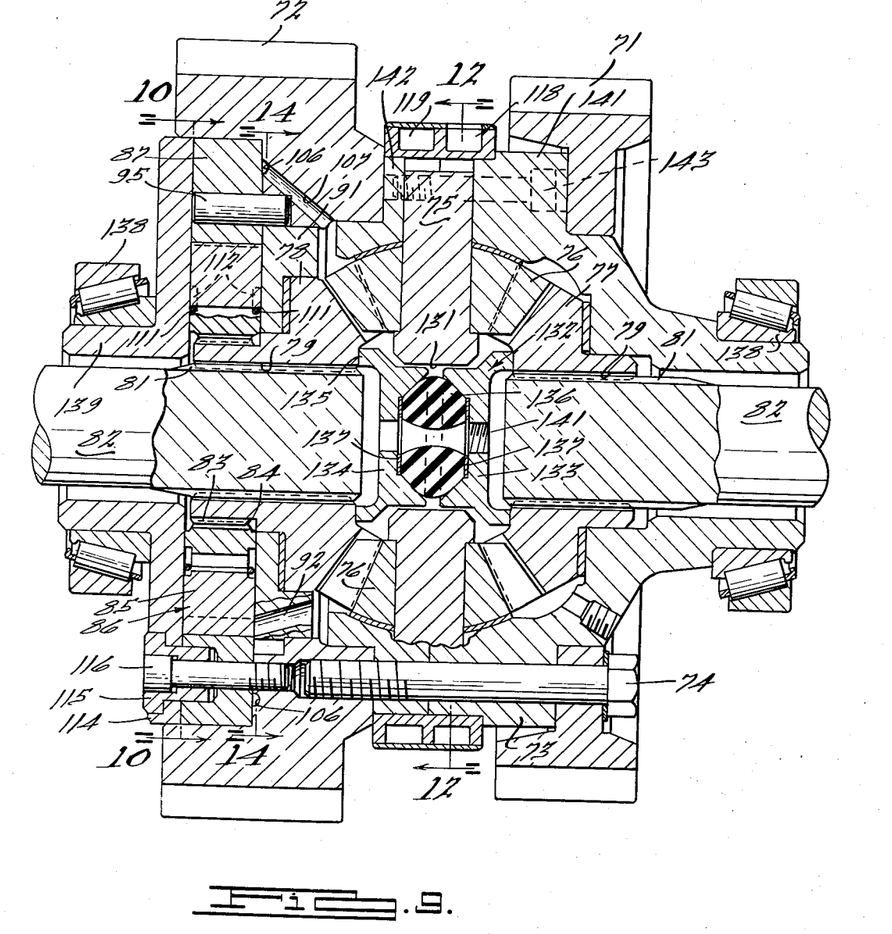
Fig. 9 is a sectional view of structure, similar to that illustrated in Fig. 1, showing a further form of the invention.

A truck axle is illustrated in Figs. 9 to 14, in which the unit illustrated in Fig. 9 is driven from an adjacent unit either through a high speed gear 71 or a low speed gear 72. The two gears are secured together and to a case 73 by a plurality of bolts 74. The case supports a spider 75 having bevel gears 76 on each of the four arms thereof, with the gears engaging the teeth of a pair of side gears 77 and 78 which have internal splines 79 connected to splines 81 on axles 82. The side gear 78 has an external spline 83 which engages a spline 84 on a rotor 85 of the fluid locking mechanism 86 of the differential. The rotor 85 operates within a compression ring 87 having an oblate aperture 88 providing oppositely disposed compression areas 89. An angularly shiftable plate 91 is provided on the inner side of the rotor 85 and compression ring 87 having a pair of intake passageways 92 provided therethrough for delivering oil from the area within the case to the compression areas 89. The plate 91 has an extending flange 93 which is cut away at diametrically opposite points at 94 for receiving a portion of diametrically disposed pins 95. The pins position the plate 91 to locate the intake ports 92 at the intake end of the compression area 89 in each direction of rotation of the case 73.

Figures 10, 11:
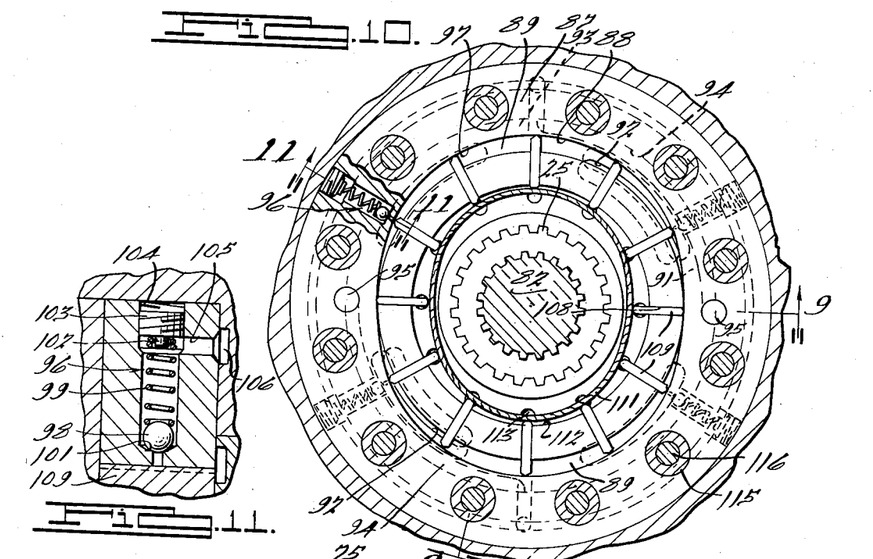
Fig. 10 is a sectional view of the structure illustrated in Fig. 9, taken on the line 10—10 thereof.
Fig. 11 is an enlarged sectional view of the structure illustrated in Fig. 10, taken on the line 11—11 thereof.
Figure 12:
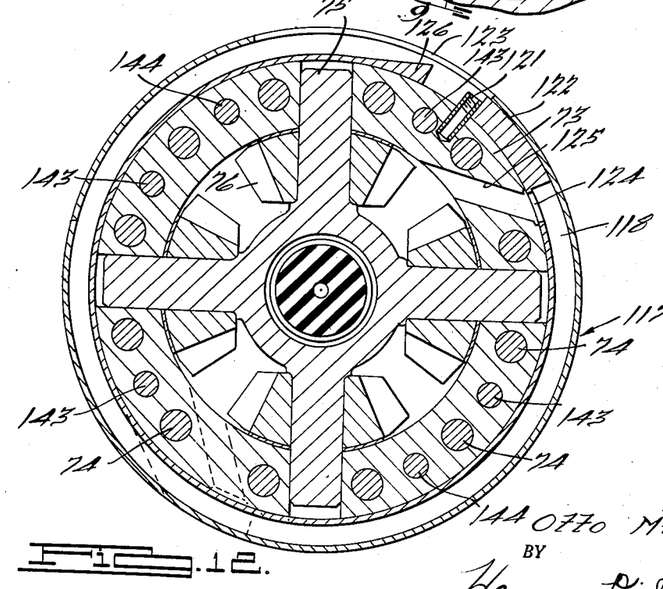
Fig. 12 is a sectional view of the structure illustrated in Fig. 9, taken on the line 12—12 thereof, with the oil applying element in delivery position for one direction of rotation of the case.
Figure 13:
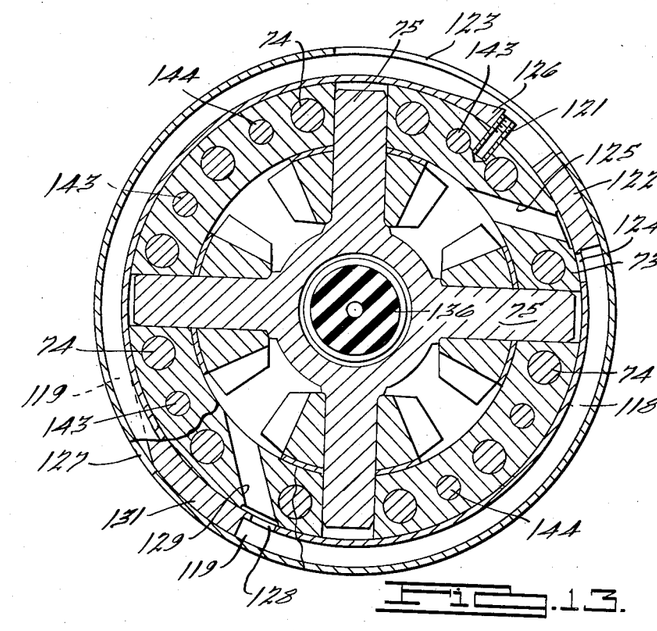
Fig. 13 is a view of the structure illustrated in Fig. 12 when the case is rotating in the opposite direction.
Figure 14:
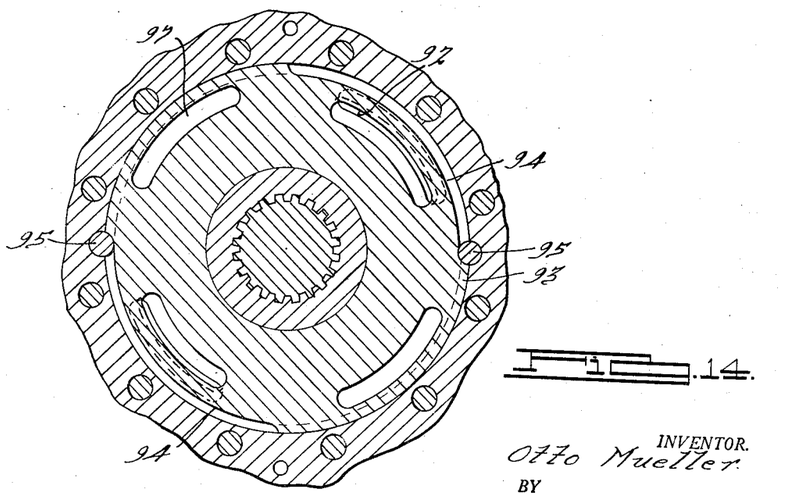
Fig. 14 is a sectional view of the structure illustrated in Fig. 9, taken on the line 14—14 thereof.

In Fig. 10 the plate 91 is illustrated when the relative rotation between the compression ring and rotor moves the pins 95 against the forward end of the cutaway areas 94 and locates the intake ports 92 at the intake end of the compression area 89. When the relative rotation is in the opposite sense, the pins 95 will be in engagement with the opposite ends of the cutaway areas 94, thereby locating the intake ports 92 at the opposite or reversed intake end of the compression area 89 since the pumping action is in the reverse direction of relative rotation. In either direction of relative rotation the compressed oil at the opposite or what would normally be known as the delivery ends of the compression areas 89 is delivered to ball check valves 96 through recesses 97 in the face of the plate 91. These recesses are diametrically disposed in the plate 91 and four of the ball check valves 96 are provided so as to have a pair of the ball check valves communicate with the pair of recesses 97 in either of the relative positions of the plate 91 and case 73. The pressure developed on the oil between the rotor 85 and compression ring 87 in the areas 89 is controlled by the pressure on the balls of the valves 96 so that the percentage of lock-up between the axles and the case can be regulated. It should be borne in mind that it is not desirable to lock up the locking mechanism 86 one hundred per cent as the strain on the parts of the differential and axles would be excessive. The amount of lock-up may vary from 30% to 70% depending upon the structure, conditions of use, and the like.

The ball check valve 96, as illustrated in Fig. 11, embodies a ball 98 and a spring 99 which urges the ball on a seat 101. The opposite end of the spring engages a boss 102 on a screw 103 which is adjustably disposed within the threaded socket 104. The oil, upon reaching a desired pressure, will unseat the ball and pass by the spring 99 into a passageway 105 and an annular recess 106. The oil discharged in this manner into the recess 106 escapes through a plurality of passageways 107 back into the interior of the case 73. The annular recess 106 is located in the shouldered face of the low speed gear 72 from which the passageways 107 extend through the body of the gear.

Slots 108 are radially disposed in the face of the rotor 85 in which a plurality of vanes or blades 109 are disposed for outward movement. An annular spring 111 is disposed in annular slots 112 in opposite faces of the rotor for engaging the inner ends of the blades and urging them outwardly against the surface of the oblated aperture 88. Oil under pressure within the slots 112 passes into apertures 113 at the base of the slots 108 and urges the blades against the surface of the aperture 88. The outer sides of the rotor 85 and ring 87 are enclosed by a plate 114 secured by bushings 115 and screws 116 to the body of the compression ring 87. The bushings 115 provide additional strength for retaining the plate in position for the size of the screws 116.

Figure 5:
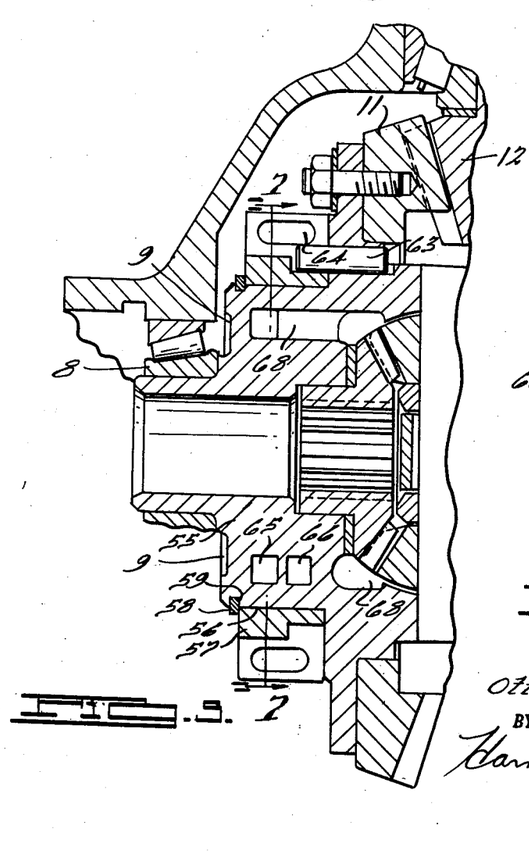
Fig. 5 is a broken sectional view of structure, similar to that illustrated in Fig. 1, showing another form thereof.
Figure 6:
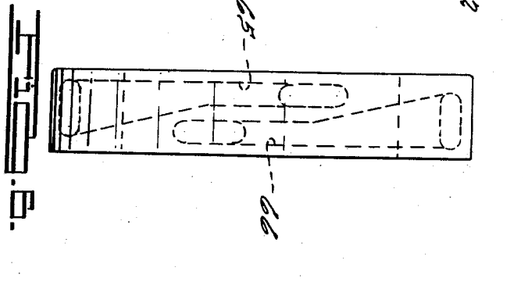
Fig. 6 is a plan view of the adjustable pumping device employed in the structure illustrated in Fig. 5.

For delivering oil from the enclosing housing, not illustrated in the views but which is similar to the housing 47 of Figs. 4 and 5, to the interior of the case, an annular element 117 is applied to the case 73 between the gears 71 and 72. The element 117 has a pair of adjacent passageways 118 and 119, one of which is disposed to scoop up oil from the bottom of the housing and deliver it to the interior of the case when the case is rotated in one direction, while the other passageway is ineffective but will deliver oil to the case when the case is rotating in the opposite direction and the first passage is inoperative. For example, in Fig. 12 the case 73 is rotating in a clockwise direction, having a pin 121 therein advance to strike one end of a block 122 and drive the element 117 in a clockwise direction. Oil will enter the passageway 118 through a slot 123 and will proceed through the passageway until it strikes the opposite end of the block 122, at which point the oil will pass inwardly through an aperture 124 into a passageway 125 to within the interior of the case. When the case 73 operates in a counterclockwise direction, the pin 121 advances and strikes a stop element 126 to drive the element 117 in a counterclockwise direction. In this ararngement the block 122 will close the passageway 125 to trap the oil in the case while oil will enter a slot 127 into the passageway 119 and will pass through an aperture 128 into a passageway 129 which communicates with the interior of the case 73. The passageway 129 is closed by a block 131 similar to the block 122 when the oil is delivered through the passageway 118 to the passageway 125. In this manner, in either direction of rotation of the case 73, oil will be positively delivered to the interior of the case from either of the passageways 125 or 129, the other of the passageways being closed to prevent the escape of the oil from within the case. The oil delivered to the case lubricates the gears 76, 77 and 78 and the supports therefor and assures the proper lubrication of all of the bearing surfaces. Not only are the elements of the case properly lubricated at all times but a reservoir of oil is provided for the intake openings 92 of the plate 91 for delivering fluid to the compression areas 89 of the fluid locking device 86 when employed additionally on the differential. It is to be understood that the pump element 117 may be employed upon the case alone without the fluid lock 86 since oil will be delivered thereby to within the case about the gears and bearings to provide adequate lubricant therefor at all times.

The spider 75 has a central aperture 131 in which a pressure applying device 132 is mounted. This device embodies cup-shaped elements 133 and 134 which are preferably made of bronze and provided with a flange 135 which engages the inner flat faces of the side gears 77 and 78. A cylindrical compression element 136, preferably made of neoprene having end washers 137 preferably bonded thereto, is disposed between the elements 133 and 134 with the cylindrical element 136 under substantial compression, sufficient to apply a force of several hundred pounds between the cup-shaped elements 133 and 134. The elements seal the area about the shafts from the fluid within the case and apply a pressure between the side gears 77 and 78. The pressure urges the plate 91 into sealing engagement with the inner face of the rotor 85 and ring 87. This pressure applying device forms the subject matter of a divisional application Serial Number 765,267 filed September 22, 1958.

The right-hand end of the case 73 has a cylindrical shouldered end for supporting a bearing 138, while the plate 114 has a similar cylindrical end 139 for supporting a like bearing 138. When assembling the pressure applying device 132 within the interior of the spider 75, a headed stud is employed having a long threaded end which is screwed into the thread 141 in the cup-shaped element 133. The screw is tightened to compress the element 136 beyond that herein illustrated so that the side gears and the other elements of the case may be assembled together, after which the stud is removed, permitting the tension on the neoprene compressed cylinder 136 to apply opposite force to the elements 133 and 134.

The case 73 is made of two halves 141 and 142 to receive the arms of the spider 75, after which four bolts 143 lock the two halves in secured position. A pair of dowel pins 144 accurately aligns the two halves of the case before the bolts secure them together.

What is claimed is:

1. In a differential gear device for a vehicle having a housing with oil therein, a case rotatable within the housing, differential gear elements within the case, said case having an enclosed unobstructed circumferentially extending passageway communicating at one end with the interior of said case and at the other end with the exterior of said case, said other end comprising an open intake end facing in the direction of rotation of said case for scooping up oil from the housing and delivering it, through said passageway, to the interior of said case.

2. In a differential having a housing for containing oil, a case supported within the housing for rotation therein, and a pumping element mounted on said case for angular adjustment thereon, said element having an enclosed pair of circumferential passageways with the intake ends presenting in opposite directions for scooping up the oil from the housing and delivering it to the case in either direction of rotation of the case through one of two passageways leading thereto, one passageway being closed when the other is open by the angular adjustment of said element.

3. In a differential having a housing for containing oil, a case supported within the housing for rotation therein, a pumping element mounted on said case for angular adjustment thereon for scooping up the oil from the housing and delivering it to the case in either direction of rotation of the case due to said angular adjusted position, a differential in said case, and a fluid actuated locking device on said case receiving oil delivered to said case, the oil within the device producing the lock.

4. In a differential having a housing for containing oil, a case supported within the housing for rotation therein, a pumping element mounted on said case for angular adjustment thereon for scooping up the oil from the housing and delivering it to the case in either direction of rotation of the case, a differential in said case, a fluid actuated locking device for said differential on said case, and a shiftable plate having intake ports therein for delivering fluid to said device in either direction of relative rotation of said fluid locking device.

5. In a differential having a housing containing oil, a case supported for rotation within the housing, axle driving means within the housing, and differential means within the case for driving said axle driving means, said case having enclosed circumferential passageways extending from the exterior to the interior thereof with their intake ends facing in opposite directions to scoop up oil from the housing and deliver it to within the case in either direction of rotation of the case, at least that passageway whose intake end faces the direction of rotation of said case being unobstructed.

6. In a differential having a housing containing oil, a case supported for rotation within the housing, axle driving means within the housing, differential means within the case for driving said axle driving means, said case having enclosed circumferential passageways extending from the exterior to the interior thereof with their intake ends facing in opposite directions to scoop up oil from the housing and deliver it to within the case in either direction of rotation of the case, at least that passageway whose intake end faces the direction of rotation of said case being unobstructed, and a rotatable fluid locking element between the case and the axle driving means which receives the delivered fluid to the case and produces a lock in either direction of relative rotation between the rotatable fluid locking means and case.

7. In a differential for a housing containing oil, a case supported for rotation within the housing, differential gear means within the housing including axle driving means, and means on said case shiftable to one position for scooping up the oil from the housing when the case is operating in one direction for delivering oil from the housing to within the case and shiftable to a second position for scooping up and delivering oil from the housing to within the case when the case is rotating in the opposite direction.

8. In a differential for a housing containing oil, a case supported for rotation within the housing, differential gear means within the housing including axle driving means, means on said case shiftable to one position for scooping up the oil from the housing when the case is operating in one direction for delivering oil from the housing to within the case and shiftable to a second position for scooping up and delivering oil from the housing to within the case when the case is rotating in the opposite direction, and fluid locking means between the case and an axle driving means which receives oil delivered to the case and forms a lock for preventing excessive relative rotation between said axle driving means.

9. In a differential for a housing containing oil, a case supported for rotation within the housing, differential gear means within the housing including axle driving means, a pump element on said case shiftable to one position when the case is operating in one direction for delivering oil from the housing to within the case and shiftable to a second position for delivering oil from the housing to within the case when the case is rotating in the opposite direction, fluid locking means between the case and an axle driving means which receives oil delivered to the case and forms a lock for preventing excessive relative rotation between said axle driving means, said lock producing a pressure on said oil, and means for relieving said pressure to prevent it from exceeding a predetermined amount for regulating the degree of lock provided by the fluid locking means.

10. In a differential having a housing containing oil, a case, a differential mechanism in said case for driving a pair of axles in a manner to permit differential movement therebetween, a shiftable pump element on said case for scooping up oil from the housing and delivering it to the case in either direction of rotation of the case, a fluid lock on said differential mechanism, and a plate on said case shiftable to different positions for controlling the delivery of the oil from the case to the fluid lock in either direction of operation of said lock.

11. In a differential having a housing containing oil, a case, a differential mechanism for driving a pair of axles in a manner to permit differential movement therebetween, a shiftable pump element on said case for scooping up oil from the housing and delivering it to the case in either direction of rotation of the case, a fluid lock for said differential mechanism, a plate on said case shiftable to different positions for controlling the delivery of the oil from the case to the fluid lock in either direction of operation of said lock, and a piston sealed to the case and disposed adjacent to said plate in communication with oil pressurized by the lock for urging the plate toward said fluid lock.

12. In a differential having a housing containing oil, a case within the housing, a pair of side gears within the housing for driving axles which extend therefrom, additional gears connected to said first gears within the case, a rotatable fluid lock on said case for locking to said gears, said case having a shiftable plate on the inner face thereof provided with intake orifices which are shifted into different positions for delivering fluid to the lock depending upon the direction of relative rotation of the lock, and a piston adjacent to said plate to which the pressurized oil from the lock is delivered for urging the piston toward the plate and the plate against the fluid lock.

13. In a differential having a housing containing oil, a rotatable case within the housing, gears supported within the case, side gears in engagement with said first gears and having adjacent faces, a pressure element embodying a pair of cuplike members having resilient means under pressure therebetween disposed against the adjacent faces of the side gears and exerting pressure thereon, and a pump element on said case shiftable to different positions for different directions of rotation of the case, said elements having passageways therethrough certain ones of which are effective in the one direction of rotation of the case for supplying oil from the housing to the case during the time another passageway is cut off therefrom and said other passageway supplying fluid from the housing to the case in the opposite direction of rotation of the case when the first said passageway is cut off from the case.

14. In a differential having a housing containing oil, a rotatable case within the housing, gears supported within the case, side gears in engagement with said first gears and having adjacent faces, and a pump element on said case shiftable to different positions for different directions of rotation of the case, said pump element having passageways therethrough certain ones of which are effective in the one direction of rotation of the case for scooping up oil from the housing and delivering it to the case during the time another passageway is cut off therefrom by the shifting of said element and said other passageway supplying fluid from the housing to the case in the opposite direction of rotation of the case when the first said passageway is cut off from the case by the reverse shifting of said element.

References Cited in the file of this patent

UNITED STATES PATENTS

| | | |
|---|---|---|
| 395,482 | Burton | Jan. 1, 1889 |
| 1,466,320 | West | Aug. 28, 1923 |
| 2,042,784 | Harsel | June 2, 1936 |
| 2,102,973 | Porsche | Dec. 21, 1937 |
| 2,463,091 | Dortout | Mar. 1, 1949 |
| 2,627,190 | Bottcher | Feb. 3, 1953 |
| 2,734,398 | Bottcher | Feb. 14, 1956 |

FOREIGN PATENTS

| | | |
|---|---|---|
| 499,048 | Great Britain | Jan. 18, 1939 |
| 1,083,711 | France | Jan. 12, 1955 |

UNITED STATES PATENT OFFICE

CERTIFICATE OF CORRECTION

Patent No. 2,861,477                                            November 25, 1958

Otto Mueller

It is hereby certified that error appears in the printed specification of the above numbered patent requiring correction and that the said Letters Patent should read as corrected below.

Column 9, line 4, after "locking" insert -- it --.

Signed and sealed this 14th day of April 1959.

(SEAL)
Attest:

KARL H. AXLINE
Attesting Officer

ROBERT C. WATSON
Commissioner of Patents